Nov. 29, 1960 C. D. SMITH, JR 2,961,745

DEVICE FOR ASSEMBLING MAGNETIC CORE ARRAY

Filed Dec. 29, 1955 4 Sheets-Sheet 1

INVENTOR
CLIFFORD D. SMITH, JR.

BY
William V. Schelberg
AGENT

Nov. 29, 1960 C. D. SMITH, JR 2,961,745

DEVICE FOR ASSEMBLING MAGNETIC CORE ARRAY

Filed Dec. 29, 1955 4 Sheets-Sheet 2

INVENTOR
CLIFFORD D. SMITH, JR.

BY William V. Schelberg

AGENT

Nov. 29, 1960 C. D. SMITH, JR 2,961,745

DEVICE FOR ASSEMBLING MAGNETIC CORE ARRAY

Filed Dec. 29, 1955 4 Sheets-Sheet 3

INVENTOR
CLIFFORD D. SMITH, JR.

BY William V. Schelberg

AGENT

Nov. 29, 1960 C. D. SMITH, JR 2,961,745

DEVICE FOR ASSEMBLING MAGNETIC CORE ARRAY

Filed Dec. 29, 1955 4 Sheets-Sheet 4

INVENTOR
CLIFFORD D. SMITH, JR.

BY

William V. Schelberg

AGENT

United States Patent Office 2,961,745
Patented Nov. 29, 1960

2,961,745

DEVICE FOR ASSEMBLING MAGNETIC CORE ARRAY

Clifford D. Smith, Jr., Wilton, Conn., assignor to International Business Machines Corporation, New York, N.Y., a corporation of New York Filed Dec. 29, 1955, Ser. No. 556,166

9 Claims. (Cl. 29—155.5)

This invention relates to magnetic core memory arrays and is directed in particular to apparatus for facilitating the assembly of such arrays.

Magnetic cores having a rectangular hysteresis characteristic are generally employed for memory purposes and are conventionally arranged in rows and columns with a single turn winding passing through the cores in each individual row and in each individual column to be used for selection of a particular core in a selected plane or group of planes by coincident energization of a single column and row winding. Each single plane may be provided with a third winding comprising an output winding that links each core of the plane in one or the other polarity sense or in alternate sense or with half the cores in one sense and half in the other sense so as to balance out the effects of those cores that are only partially excited by one or the other winding during coincident energization of a row and column winding to select a particular core for interrogation. In a three dimensional array, each plane of cores is also provided with a fourth winding conventionally termed the inhibit winding that is selectively pulsed during a write interval to prevent the combined effects of the magnetomotive forces provided by the row and column windings from causing a change in remanence state of the core in that plane when writing or rewriting information or binary characters in the array. In this instance of application, like positioned cores in the several stacked two dimensional array planes comprise bits of a binary word and the similar row and column windings of each bit plane are series connected so that on energization of these windings in coincidence, the core in each plane linked thereby would attain a one representing remanence state unless inhibited by pulsing the fourth winding individual to that plane.

Heretofore, magnetic core arrays of the type described have been assembled manually with the windings threaded through the cores and providing support therefor in the completed matrix. This means of assembly has become increasingly time consuming and expensive since arrays of greater capacity requiring a large number of cores are used, with the tendency being toward increasing bit capacity and use of smaller sized cores.

The present invention contemplates apparatus wherein the assembly of cores arrays is greatly facilitated and is adapted for performance under control of a programmed, self-regulated machine in an economical, high speed process. The apparatus comprises a jig with one surface having recesses formed therein and arranged in rows and columns to accommodate the magnetic cores that are to be connected into the matrix. Slots are also provided in the surface of the jig and are arranged along the row and column coordinates and diagonally so as to intersect the recesses. These slots accommodate the windings of the array and those in one coordinate direction are deeper than those in the other coordinate direction while the diagonal slots are of lesser depth than either of the coordinate slots.

The recesses in the jig are so formed that the cores stand upon edge and a cover, having inserts of a flexible material at counterpart positions to the several recesses, is provided that holds the cores in fixed positions. The cover is also provided with holes, pairs of which bridge each recess and overlie the slots, with the holes arranged perpendicular to the plane of the slots. Winding wires are first positioned through one set of coordinate slots and pass through the central opening of the cooresponding cores. A first set of pins is then inserted through the cover holes and act against these wires holding them toward the bottom of the slots and against the lower edge of the central opening in the cores. The wires for the other coordinate dimension are next inserted and pass intermediate these pins so as to overlie the first set of wires. The first and second set of coordinate wires form the coincident selection windings of the array. Following this, the array may be mounted into a framework and connections made to the terminals of these windings. Thereafter a second set of pins are inserted through other holes in the cover to hold down the last set of inserted wires and another set of wires is inserted through the slots in one coordinate to provide the inhibit windings. Subsequently, the diagonal wires forming the sense windings are inserted with the prior inserted inhibit wires held down by the first set of pins.

The aforementioned framework is provided with conductive portions engageable with the terminal ends of the several sets of wires to connect them in any desired circuit arrangement and dip-soldering procedure may be used. After such connections have been made, the jig and cover are removed and the windings themselves support the cores within the frame member and a plurality of these frames may be mounted in superimposed position to be interconnected as a three dimensional array.

Accordingly, one object of this invention is to provide improved apparatus for assembling a magnetic core array.

A further object of the invention is to provide apparatus for facilitating production of magnetic core arrays and adapted for use with a self-regulated programmed machine.

Another object of the invention is to provide a jig for facilitating the insertion of windings through a plurality of magnetic cores in forming an array of such cores.

Other objects of the invention will be pointed out in the following description and claims and illustrated in the accompanying drawings, which disclose, by way of example, the principle of the invention and the best mode, which has been contemplated of applying that principle.

A typical three dimensional array of magnetic cores comprising an assembly of two dimensional arrays that are superimposed physically and electrically connected is illustrated, for example, in an article entitled "Ferrites Speed Digital Computers," by D. R. Brown and E. Albers-Schoenberg, appearing on page 146 of Electronics, issue of April 1953. Further arrangements of this kind are described and claimed in the application of E. W. Bauer and M. K. Haynes, Serial Number 443,284, filed July 14, 1954, which application is assigned to the present assignee.

In such systems a particular core is selected by the simultaneous energization of one winding in each coordinate direction so that the current pulse on each coordinate line provides a magnetomotive force to each core that it links, which force is less than the threshold coercive force, and the single core energized by both windings receives double this force. The selected core located at the intersection of both energized windings is thus caused to change from one digit representing remanence state to the other remanence state, if it was at the one state, and this flux change develops an induced voltage in a sense winding indicating this fact. If the other remanence state had been stored in the interrogated core, little flux change takes place and the sense winding signal is of low value, so that storage of ones and zeros may be distinguished. Writing and reading operations are similar but with the sense of the drive pulses applied to the coordinate selection windings reversed. Writing a zero may be accomplished in a two dimensional array by failure to apply the write direction pulses in coincidence, and in a three dimensional array, where the selection lines link like positioned cores of plural planes to define words of plural bits, the pulses may be applied in coincidence with their effect counteracted in selected plane, where zeros are desired, by pulsing an inhibit winding in that bit plane. Four windings are required for each core to provide input, output, control and detection. The inhibit winding in each two dimensional plane links all the cores in the same polarity sense while the sense winding links the cores in alternate diagonals in an opposite sense. The diagonal winding pattern of the sense winding provides a bidirectional output signal but, since those cores that are linked only by one energized coordinate winding are partially excited and contribute some output signal on interrogation, the effects of non-selected cores tend to cancel one another. Many other sense winding configurations are feasible wherein the half select signals are counter balance, however, the diagonal pattern shown in the present instance is sufficient to demonstrate the principles of the invention.

Figure 1:
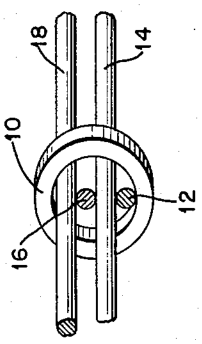
Figure 1 illustrates the positioning of the several winding wires through a single magnetic core.

Referring now to Figure 1, a single core 10 of such an array is illustrated as a toroid with the aforementioned windings comprising single turns inserted through the central opening. Conductors 12 and 14 comprise the coordinate selection windings, conductor 16 the inhibit winding and conductor 18 the sense winding.

Figure 3:
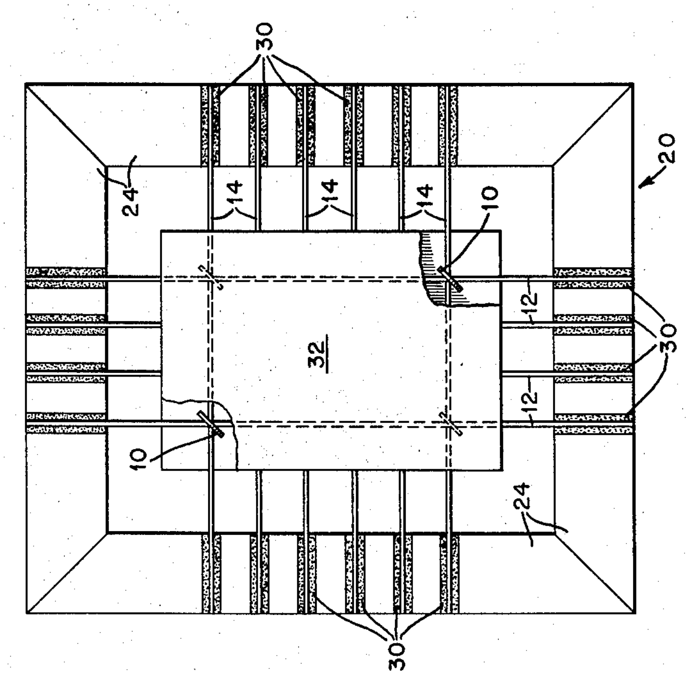
Figure 3 is a plan view of the array assembly illustrating the side seen from the rear in Figure 2 and showing the conductive pattern on the supporting frame for connecting the coordinate selection windings.
Figure 2:
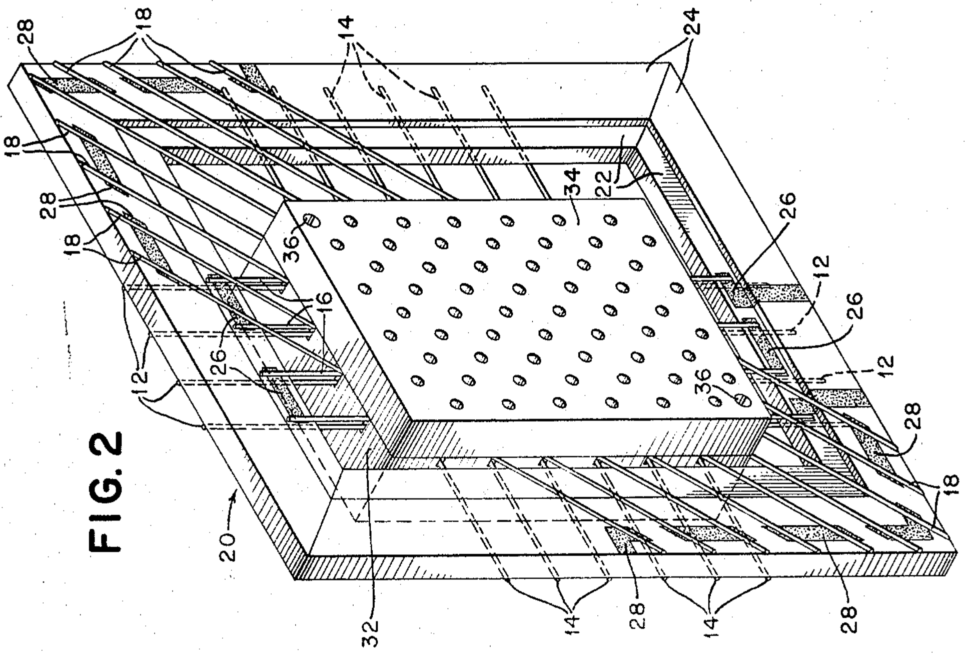
Figure 2 is a schematic diagram of a single plane array of magnetic cores mounted in a connected framework and showing the assembly jig in position.

A plurality of such cores arranged in a single plane matrix assembly is shown in isometric view in Figure 2 where array is supported by a frame 20. The frame is provided with a recessed central portion having a surface designated 22 with the lateral surfaces of the frame designated as portions 24. Conductive areas 26 and 28, respectively, are provided on these surfaces with connections for the inhibit winding 16 and sense winding 18, respectively, made to these areas by dip soldering or other known methods. Further conductive areas 30 are provided on the opposite lateral surface of the frame 20 as shown in Figure 3 and provide connections for the coordinate selection windings 12 and 14.

As shown in Figure 2, the cores and windings are enclosed in an assembly device in accordance with the invention. This device comprises a first portion or jig 32 and a second portion or cover 34. These two parts are held together by screws 36 or other like means and, at the stage of fabrication shown in Figure 2, are to be removed before the completed single plane is assembled into a three dimensional unit as described above.

Figure 4:
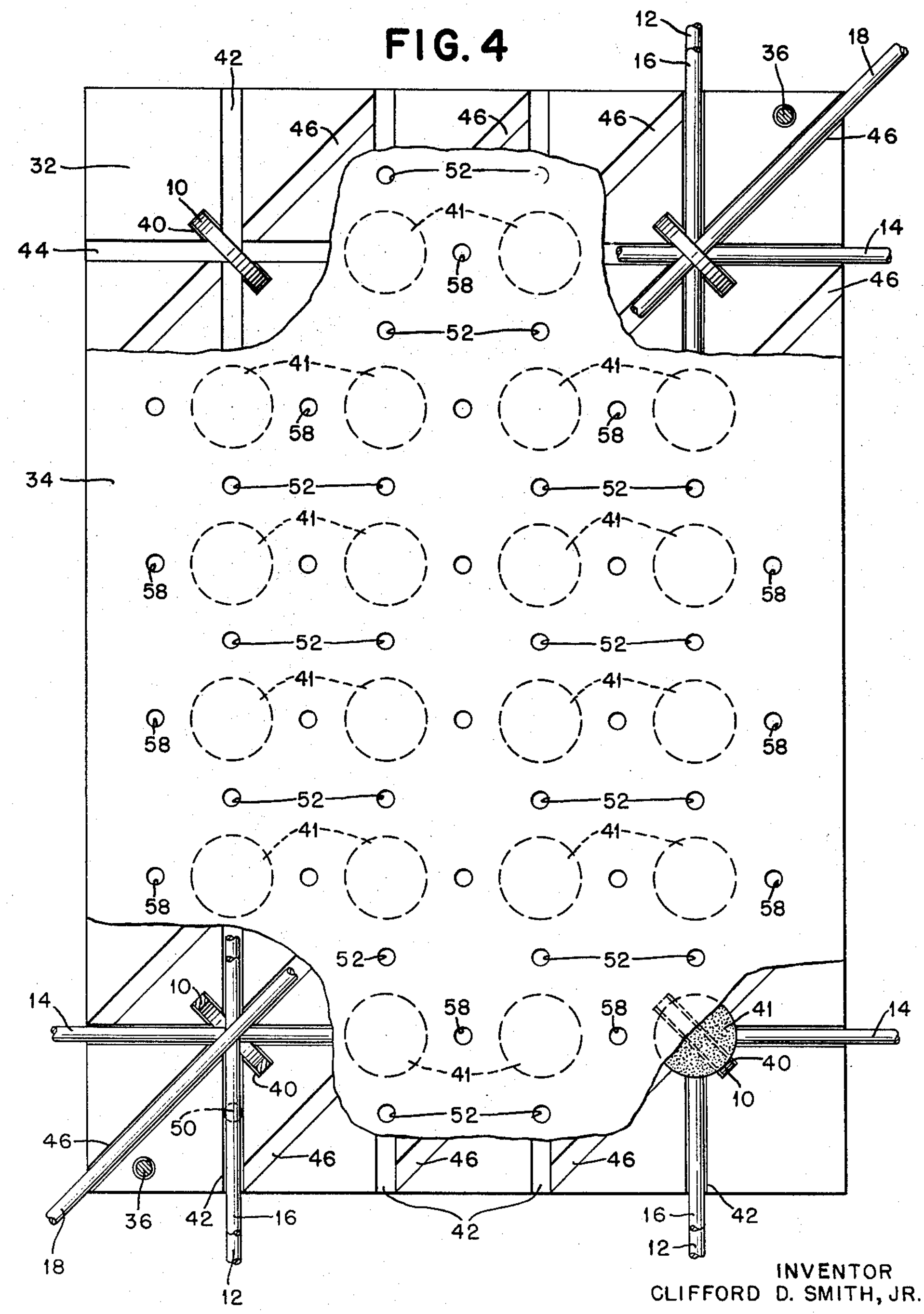
Figure 4 is a plan view of the assembly device shown with portions of the cover element removed to demonstrate the positioning of the holes therethrough and the arrangement of slots in the jig.
Figure 6:
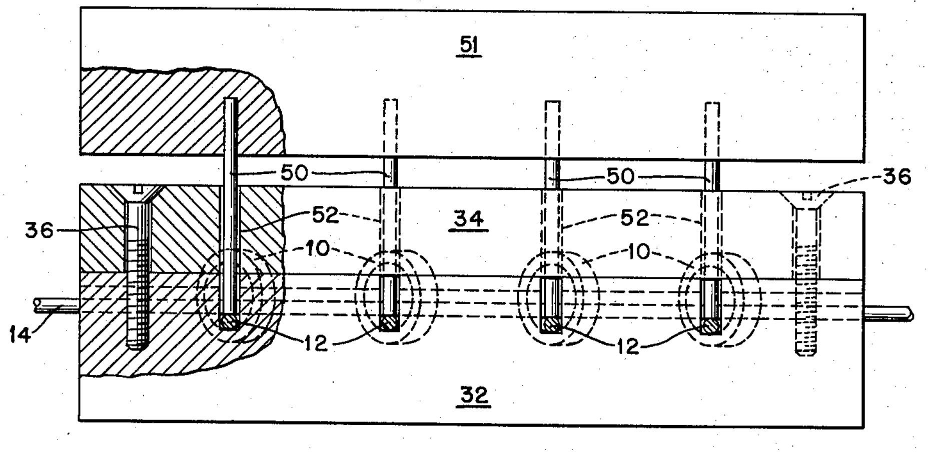
Figure 6 is a lateral view of the assembly jig and cover taken at right angles to that shown in Figure 5.
Figure 5:
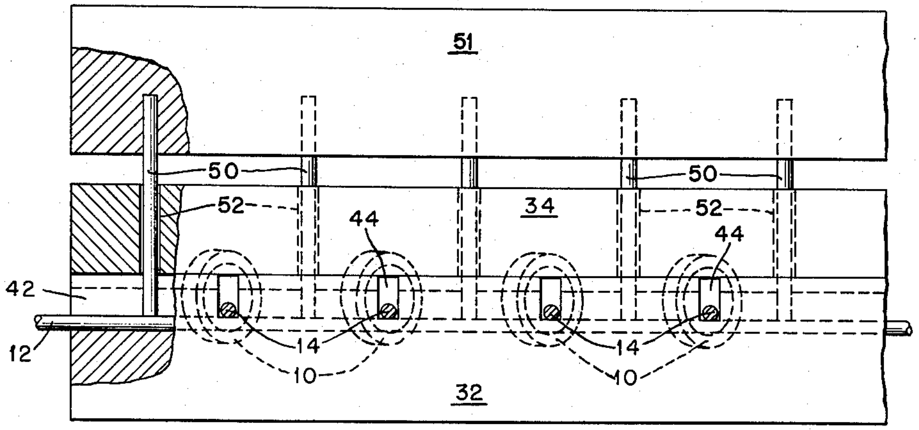
Figure 5 is a lateral view of the assembly jig and cover shown with one set of assembly pins inserted through holes in the cover.
Figure 7:
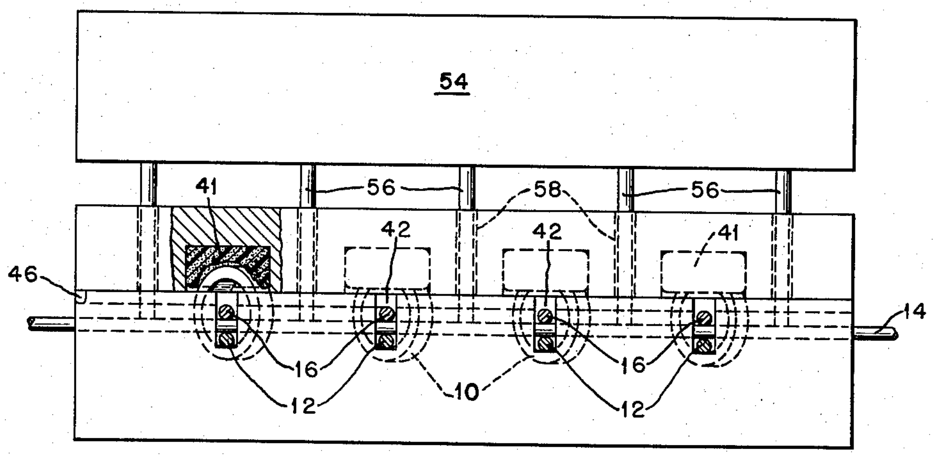
Figure 7 is a lateral view of the assembly device showing the insertion of the second set of pins in an intermediate stage of fabrication of the array.

The assembly device is illustrated more clearly in Figure 4 where a portion of the cover 34 is shown broken away in a plan view and sections therethrough are also shown in Figures 5, 6 and 7. The jig 32 is provided with recesses 40 which accommodate the cores 10 at coordinate arranged positions where they are held on edge. The upper portion of each core is engaged by a piece of flexible material 41 (Figs. 7 and 8) in similar positioned areas on the cover portion 34. Slots designated 42, 44 and 46 are formed in the block 32 and extend vertically, horizontally and diagonally, respectively, through each of core receiving recess 40. The slots 42 are made deeper than the slots 44 and the slots 46 are made more shallow than the slots 44. The core recesses and slots may be made to have depths such that the top edges of the cores lie at the surface of the jig 32 or extend above it a distance substantially equal to the diametral thickness of the core. In this first instance, with selection and inhibit windings 12, 14 and 16 made of wires 0.012 inch in diameter and the sense wire 18, 0.008 inch in diameter, the slots 42 are made 0.065 inch deep, the slots 44 are made 0.053 inch deep and the diagonal slots 46 are made 0.041 inch deep when the cores employed have an outside diameter of 0.080 inch, and an inside diameter of 0.050 inch. Such cores require that the recesses 40 be made 0.080 inch deep. In the form illustrated, the recesses and slots are made less deep so that a portion of each core extends above the surface of the jig and is engaged by the flexible material inserts 41 in the cover.

After the cores 10 have been inserted within the recesses 40 of the jig so that they stand in vertical positions as shown in Figure 4, the cover 34 is placed on top and attached by the screws 36. The set of wires 12 are then inserted through the vertical slots 42 so that they extend through the cores at the lower edges of he openings therein as shown in Figure 1. After this first set of wires has been inserted through all the vertical slots, a set of pins 50, mounted on a block 51 as seen in Figures 5 and 6, are inserted through openings 52 in the cover 34. The pins then act on the wires 12 at points on either side of each core and hold them in their lowermost position. The wires 14 are then inserted in the other coordinate direction through the slots 44 and overlie the wires 12 within the central opening of the cores. At the completion of this step, the unit is arranged within the frame 20 as shown in Figure 3 so that the wires 12 and 14 overlie the conductive portions 30 printed on the frame and permanent connections thereto are made preferably by dip soldering.

Figure 8:
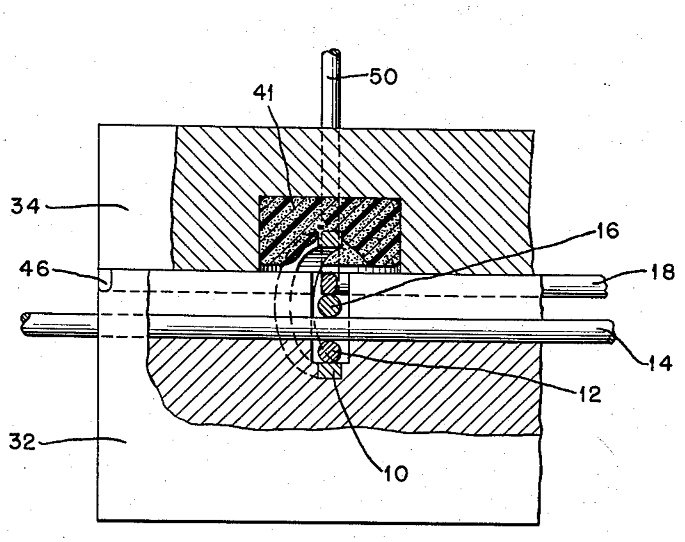
Figure 8 is a further detailed view showing the resilient inserts in the cover portions of the assembly device with the insertion of the winding wires completed.

A second holder 54 having pins 56 (Fig. 7) arranged to be received by openings 58 extending through the cover 32 (Fig. 4) at points overlying the wires 14, is next applied so that the pins 56 press against the wires 14 and hold them depressed. A second set of wires 16 is then inserted through the vertical slots 42 in the block 32. These wires 16 extend through the assembly jig along the side of the frame 20 opposite to that upon which the wires 12 and 14 are soldered and reset upon the recessed surfaces 22 (Fig. 2). After all of these wires are in place the pin holder 54 is removed and the first holder 51 is again inserted with the pins 50 again extending through the openings 52 in the cover so as to act against the wires 16 as shown in Figure 8. While these wires are held down, the sense wires 18 are inserted through the diagonal slots 46 so that they extend along the frame 20 on the same side as the wires 16 but resting against the surface 24 (Fig. 2). Conductive portions 26 and 28 are provided on the surfaces 22 and 24, engageable with the wires 16 and 18, respectively, and are adapted to connect them in series. These wires are also connected to their respective conducting portions by dip soldering and, after these connections have been made the assembly device 32 and 34 may be removed.

The arrangement of slots and connections herein indicated are representative of but a single winding pattern and it is to be understood that other arrangements may be formed by like devices as for example further vertical or horizontal slots may be provided intermediate the rows and columns of cores for interconnecting the windings in any desired pattern, or plural selection windings may be provided in each coordinate. Further, while the cover 34 is shown to be relatively thick it is obvious that a thin plate of metal, plastic or like material may be used particularly where the recesses and slots are made sufficiently deep to accommodate substantially the entire body of the cores.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. Apparatus for facilitating the assembly of an array of toroidal magnetic cores for use as a memory component, said apparatus comprising a jig having a plurality of recesses in one surface arranged in coordinate directions and sets of slots in said one surface intersecting one another at certain of said recesses, each set of slots being located in a different level from the level of each other set of slots, a cover member for said jig adapted to overlie said one surface thereof and having openings therethrough perpendicular to said one surface intermediate said recesses and overlying said slots, and means comprising sets of pins for insertion in said holes overlying slots in one and the other of said coordinate directions.

2. Apparatus for assembly of an array of magnetic storage elements arranged in coordinate rows and columns and linked by selection and control winding wires, said apparatus comprising a jig having recesses arranged in a surface thereof in each coordinate dimension with each said recess adapted to accommodate a toroidal magnetic core, sets of slots arranged in the surface of said jig and intersecting one another at selected groups of said recesses, said sets of slots being provided at graduated depths differing from one another by the diameter of at least one of the winding wires to be inserted therethrough and means for depressing winding wires in at least one set of slots.

3. Apparatus for facilitating the assembly of an array of magnetic storage elements arranged in coordinate rows and columns and linked by selection and control winding wires, said apparatus comprising a plate like jig having recesses in one surface arranged in coordinate directions with each recess adapted to receive a toroidal core so as to stand on edge in a plane bisecting said coordinate directions, a plurality of sets of slots in said one surface intersecting one another at certain of said recesses at least along said coordinate directions, each set of slots being located in a different level from the level of each other set of slots, a cover member for said jig adapted to be superimposed over said one surface and having holes therethrough perpendicular to said one surface positioned intermediate said recesses and in line with said slots, means comprising a set of pins for insertion in certain ones of said holes that overlie the slots in one of said coordinate directions, and further means comprising a set of pins for insertion in other ones of said holes that overlie the slots in another of said coordinate directions.

4. Apparatus for facilitating the insertion of winding wires in an array of toroidal magnetic cores comprising a plate-like jig having recesses in one surface thereof arranged in row and column coordinate directions and each adapted to support a single toroidal core therein on edge, a plurality of sets of slots provided in said one surface at least along said row and column coordinate directions and intersecting one another at a point corresponding to one of said recesses, a first set of said slots having a depth such that the lower surface of the slots is substantially in alignment with the lower inner surface of the central opening in a toroidal core when inserted edgewise in said recesses, a second set of said slots having a depth less than that of said first set by at least the diameter of one of the winding wires to be inserted in said first set of slots, and a third set of slots having a depth less than that of said second set by at least the diameter of one of the winding wires to be inserted in said second set of slots.

5. A method for assembly of an array of toroidal magnetic cores for use as a memory component wherein a jig is provided having recesses in one surface arranged in coordinate directions and slots in said one surface interconnecting certain of said recesses with a cover for said jig having openings therein perpendicular to said surface intermediate said recesses and overlying said slots, said method comprising inserting cores in said recesses edgewise, affixing said cover to said jig, inserting a first set of winding wires through said slots in one coordinate direction, inserting a first set of pins in the opening in said cover so as to hold said wires in the lowermost position, inserting a second set of winding wires through the slots in another coordinate direction, removing said first set of pins, inserting a second set of pins in the openings in said cover so as to hold said first and second sets of wires in the lowermost position, inserting a third set of wires through the slots in said one coordinate direction, removing said second set of pins, inserting said first set of pins through the openings in said cover so as to hold said first, second and third set of wires in their lowermost positions, inserting a fourth set of wires through slots arranged diagonally to said two coordinate directions and intersecting said recesses, and connecting the ends of said wires to a frame member.

6. Apparatus for facilitating the assembly of an array of toroidal magnetic cores for use as a memory component, said apparatus comprising a plate-like jig having recesses in one surface arranged in coordinate rows and columns and each adapted to receive a toroidal magnetic core in edgewise position, said jig having sets of slots in said one surface intersecting one another at points corresponding with certain of said recesses along said coordinate rows and columns and linking certain of said recesses along directions diagonal to said rows and columns, each set of slots being located in a different level from the level of each other set of slots, and means for depressing winding wires in at least one set of slots.

7. Apparatus for facilitating the insertion of winding wires in an array of toroidal magnetic cores, said apparatus comprising a plate-like jig having recesses in one surface arranged in coordinate rows and columns and each adapted to receive a toroidal magnetic core in edgewise position, said jig having sets of slots in said one surface interconnecting certain of said recesses along said coordinate rows and columns and along a direction diagonal to said rows and columns, each set of slots being located in a different level from the level of each other set of slots, a cover for said jig adapted to overlie said one surface thereof, said cover having openings therethrough perpendicular to said one surface intermediate said recesses and overlying certain of said slots, and means comprising sets of pins for insertion in said openings to depress wires that may be inserted in said slots.

8. Apparatus for facilitating the insertion of winding wires in an array of toroidal magnetic cores comprising a plate like jig having recesses in one surface arranged in coordinate rows and columns, said recesses being of a depth substantially equal to the outside diameter of the cores to be employed in said array and adapted to receive a core in edgewise position in a plane bisecting said coordinate row and column directions, said jig having sets of slots in said one surface interconnecting certain of said recesses along said coordinate rows and columns and along a direction diagonal to said rows and columns, each set of slots being located in a different level from the level of each other set of slots, and means for depressing winding wires in at least one set of slots.

9. Apparatus for facilitating the insertion of winding wires in an array of toroidal magnetic cores comprising a plate-like jig having recesses in one surface arranged in coordinate rows and columns, said recesses being of a depth substantially equal to the outside diameter of the cores to be employed in said array and adapted to receive a core in edgewise position in a plane bisecting said coordinate row and column directions, said jig having sets of slots in said one surface interconnecting certain of said recesses along said coordinate rows and columns and along a direction diagonal to said rows and columns, each set of slots being located in a different level from the level of each other set of slots, a cover for said jig adapted to overlie said one surface thereof, said cover having openings therethrough perpendicular to said one surface intermediate said recesses and overlying certain of said slots, and means comprising sets of pins for insertion in said openings to depress winding wires that may previously be inserted in said slots.

References Cited in the file of this patent

UNITED STATES PATENTS

| | | |
|---|---|---|
| 2,252,090 | Morin | Aug. 12, 1941 |
| 2,550,898 | Youngblood | May 1, 1951 |
| 2,573,087 | Youngblood et al. | Oct. 30, 1951 |
| 2,700,150 | Wales | Jan. 18, 1955 |